US012217117B2

(12) United States Patent
Limburg

(10) Patent No.: US 12,217,117 B2
(45) Date of Patent: Feb. 4, 2025

(54) ELECTRONIC BUSINESS CARD AND CONTACT MANAGEMENT SYSTEM WITH INTEGRATED TARGETED MARKETING PLATFORM

(71) Applicant: Lulu Systems, Inc., New York, NY (US)

(72) Inventor: Pieter Limburg, Jersey City, NJ (US)

(73) Assignee: LULU SYSTEMS, INC., New York, NY (US)

( * ) Notice: Subject to any disclaimer, the term of this patent is extended or adjusted under 35 U.S.C. 154(b) by 0 days.

(21) Appl. No.: 17/672,661

(22) Filed: Feb. 15, 2022

(65) Prior Publication Data

US 2022/0261614 A1 Aug. 18, 2022

Related U.S. Application Data

(60) Provisional application No. 63/250,439, filed on Sep. 30, 2021, provisional application No. 63/150,369, filed on Feb. 17, 2021.

(51) Int. Cl.
*G06K 19/077* (2006.01)
*G06Q 30/01* (2023.01)
(Continued)

(52) U.S. Cl.
CPC ....... *G06K 19/07775* (2013.01); *G06Q 30/01* (2013.01); *H04B 5/72* (2024.01); *H04W 4/80* (2018.02)

(58) Field of Classification Search
CPC ......... G06K 19/07775; G06K 19/0723; G06Q 30/01; H04B 5/0031; H04W 4/80
(Continued)

(56) References Cited

U.S. PATENT DOCUMENTS 8,602,327 B2 12/2013 Meslin
9,058,397 B1 6/2015 Boyle
(Continued)

FOREIGN PATENT DOCUMENTS

CN 103106210 A 5/2013
CN 203911978 U 10/2014
(Continued)

OTHER PUBLICATIONS

Martin Ebner, QR Code—the Business Card of Tomorrow?, dated Nov. 6, 2008, 6 pages, originally published in: Proceedings FH Science Day, Linz, Austria.
(Continued)

*Primary Examiner* — Eugene Yun
(74) *Attorney, Agent, or Firm* — Steven M. Koehler; Westman, Champlin & Koehler, P.A.

(57) ABSTRACT

A system for communication of business card information, the system comprising an electronic business card comprising a near-field communication (NFC) chip, the NFC chip having electronic business card information, wherein the electronic business card information is configured to instigate an action in a recipient device when the NFC chip proximally interfaces with the recipient device, and wherein the recipient device is NFC enabled. The system may further comprise a network and an application system in operable communication with the network, the application system configured to transmit a user information associated with a user of the electronic business card to a database configured to store the user information, and the application system configured to permit the user to interact with the user information via a user interface.

18 Claims, 14 Drawing Sheets

(51) Int. Cl.
*H04B 5/72* (2024.01)
*H04W 4/80* (2018.01)

(58) Field of Classification Search
USPC .................................................... 455/41.1
See application file for complete search history.

(56) References Cited

U.S. PATENT DOCUMENTS

| | | | |
|---|---|---|---|
| 9,471,865 B2 | 10/2016 | Hanmer | |
| 2011/0060640 A1 | 3/2011 | Thompson | |
| 2012/0036218 A1 | 2/2012 | Oh | |
| 2013/0046657 A1 | 2/2013 | Rice | |
| 2013/0346302 A1* | 12/2013 | Purves | G06Q 20/102 705/40 |
| 2014/0108289 A1* | 4/2014 | Eitan | G06Q 50/01 235/375 |
| 2017/0099085 A1* | 4/2017 | Huang | H04B 5/0062 |
| 2017/0160568 A1 | 6/2017 | Ribi | |
| 2017/0244437 A1 | 8/2017 | Alieri | |
| 2019/0066090 A1 | 2/2019 | Mei | |
| 2019/0228191 A1 | 7/2019 | Aviad | |
| 2019/0253431 A1 | 8/2019 | Atanda | |
| 2019/0370312 A1 | 12/2019 | Scapa et al. | |

FOREIGN PATENT DOCUMENTS

| | | |
|---|---|---|
| JP | 2007168414 A | 7/2007 |
| KR | 101423391 B1 | 7/2014 |
| KR | 102061252 B1 | 12/2019 |

OTHER PUBLICATIONS

Meg Miller, How Moo Is Redesigning Business Cards For The Digital Age, dated Oct. 10, 2015, 3 pages, originally published in: FastCompany.com.
International search report and written opinion of the International Searching Authority in relation to international application No. PCT/US2022/016495, dated Jun. 2, 2022, 7 pages.
Search Report in corresponding European Patent Application No. 22756792.2 dated Nov. 4, 2024.

* cited by examiner

Team / Show and Lock

Team Cards Fields
Choose all fields, that can be filled by your team members and then will be shown after Card Tap

| | General | | Networks |
|---|---|---|---|
| ○ | Full Name | ○ | App Store |
| ○ | Title | ○ | Facebook |
| ○ | Company | ○ | Instagram |
| ○ | Email | ○ | Linked In |
| | | ○ | Mobilenum |
| | Contacts | ○ | Parler |
| ○ | Phone | ○ | Paypal |
| ○ | Fax | ○ | Phoneum |
| ○ | Calendar | ○ | Pinterest |
| ○ | Email | ○ | PlayStore |
| ○ | Weblink 1 | ○ | Profile Note |
| ○ | Weblink 2 | ○ | QQapp |
| | | ○ | Licenses |
| | Address | ○ | Soundcloud |
| ○ | Country | ○ | Spotify |
| ○ | City | ○ | Tiktok |
| ○ | State | ○ | Twich |
| ○ | Street | ○ | Twitter |
| ○ | Building | ○ | Wechat |
| ○ | Addressline | ○ | Whats App |
| ○ | Zip code | ○ | Youtube |

Locked Fields
Choose all fields, that can be filled by your team admins and then will be shown after Card Tap

| | General | | Networks |
|---|---|---|---|
| ○ | Full Name | ○ | App Store |
| ○ | Title | ○ | Facebook |
| ○ | Company | ○ | Instagram |
| ○ | Email | ○ | Linked In |
| | | ○ | Mobilenum |
| | Contacts | ○ | Parler |
| ○ | Phone | ○ | Paypal |
| ○ | Fax | ○ | Phoneum |
| ○ | Calendar | ○ | Pinterest |
| ○ | Email | ○ | PlayStore |
| ○ | Weblink 1 | ○ | Profile Note |
| ○ | Weblink 2 | ○ | QQapp |
| | | ○ | Licenses |
| | Address | ○ | Soundcloud |
| ○ | Country | ○ | Spotify |
| ○ | City | ○ | Tiktok |
| ○ | State | ○ | Twich |
| ○ | Street | ○ | Twitter |
| ○ | Building | ○ | Wechat |
| ○ | Addressline | ○ | Whats App |
| ○ | Zip code | ○ | Youtube |

Nice to see you

FIG. 16

ELECTRONIC BUSINESS CARD AND CONTACT MANAGEMENT SYSTEM WITH INTEGRATED TARGETED MARKETING PLATFORM

CLAIM OF PRIORITY

The present application claims priority to U.S. Provisional Application No. 63/150,369 filed Feb. 17, 2021, titled "ELECTRONIC BUSINESS CARD AND CONTACT MANAGEMENT SYSTEM" and U.S. Provisional Application No. 63/250,439 filed Sep. 30, 2021 titled "ELECTRONIC BUSINESS CARD AND CONTACT MANAGEMENT SYSTEM WITH INTEGRATED TARGETED MARKETING PLATFORM," which are hereby incorporated by reference in their entirety.

TECHNICAL FIELD

The embodiments generally relate to computerized systems and methods for providing an electronic business card and contact management application.

INTRODUCTION

Business cards are cards which contain business information about a company or individual. These cards are often shared during personal interactions and especially during formal introductions as a convenience, memory aid, and means for organizing contact information for established connections. Business cards can include a variety of information, but commonly include a name, a business affiliation, and contact information such as street addresses, telephone numbers, e-mail addresses, website addresses, and the like. Traditionally, cards have been printed on card stock paper, and vary in quality, design, and content. The cards can be collected and stored for future reference. However, this requires organization by the collector in order to be effective.

In recent years, the use of computers has allowed information contained on business cards to be stored in electronic databases, thus removing the need to maintain a collection of physical business cards. However, these systems require the user to manually enter information contained on the business card, which may be too time consuming for some. In further iterations, some software solutions allow the business card to be scanned, using optical character recognition, to automatically parse information which are automatically organized in an electronic database.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The invention of the present disclosure may be a contact management and communication system for communication of business card information, where the system may comprise an electronic business card comprising a near-field communication (NFC) chip, where the NFC chip comprises a memory, an antenna, and electronic business card information stored within the memory. The electronic business card information may be encoded within an instructive radio frequency (RF) and the antenna may be configured to capture an RF field from a recipient device, where the RF field may be configured to induce a current in the NFC chip. The electronic business card information may be configured to initiate an action in the recipient device, via the instructive RF, when the NFC chip and the recipient device are within an operating distance, and the recipient device may be NFC enabled. The system may also include a network configured to enable indirect communication between the recipient device and an application system. In an embodiment, the application system is in operable communication with the network, the application system may be configured to transmit a user information associated with a user of the electronic business card to a database configured to store the user information, and the application system may be configured to permit the user to interact with the user information via the user interface.

In an embodiment, the action is configured to present, via the recipient device, a lead collection interface configured to receive a first lead contact detail, the lead collection interface in electronic communication with the network. The action may be further configured to present, via the recipient device, an enriched lead collection interface configured to receive at least a second lead contact detail, the enriched lead collection interface may be in electronic communication with the network. In an embodiment, the network is configured to transmit at least the first lead contact detail to the user. Further, the network may be configured to transmit the user information to the recipient device.

The system may further comprise a QR code disposed on the electronic business card, the QR code may be encoded with the electronic business card information and configured to instigate the action on the recipient device. In an embodiment, the system includes an administrative panel to permit an administrator to interact with the user information associated with the electronic business card. The administrative panel may be configured to assign a company profile to the user such that the company profile is appended to the user information. Further, the administrative panel may comprise a link tracking option, wherein actuation of the link tracking option enables recordation, via the application system, of recipient interactions with the user information, and wherein the recipient interactions may comprise at least a recipient's submission of the first lead contact detail.

In an embodiment, the user interface further comprises a lead interface, wherein the lead interface is configured to display the recipient interactions with the user information. The user interface may be configured to present a plurality of fields and a plurality of inputs to the user, wherein each of the plurality of fields corresponds to one of the plurality of inputs, wherein the plurality of inputs are configured to receive a plurality of values, and wherein the user information is comprised of the plurality of values.

In yet a further embodiment, the administrative panel further comprises a show and lock feature configured to set permissions in the plurality of inputs, wherein a first portion of the plurality of inputs are configured to receive a first portion of the plurality of values, via the user, and a second portion of the plurality of inputs are configured to receive a second portion of the plurality of values, via the administrator. The user information may comprise a custom code snippet configured to run on the recipient device, extract recipient information, via the recipient device, and transmit the recipient information to the network. Further, the custom code snippet may be appended to the user information by an administrator, via an administrative panel in communication with the application system. Also, the extraction of the recipient information may comprise placing a cookie on the recipient device.

The contact management and communication system may further comprise a machine learning algorithm on the application system, where the machine learning algorithm is configured to extrapolate a marketing plan from the recipient information.

The invention of the present disclosure may be a method for generating a lead using an electronic business card, the method comprising the steps of: capturing information associated with a lead via the electronic business card, wherein the electronic business card is NFC enabled; generating a customizable form to collect information from the lead; transmitting a first message to the lead comprising contact details of a card owner; transmitting a second message to the card owner comprising contact details of the lead; and initiating an automated action to the lead. The first message and the second message may be SMS messages.

The method may further comprise the steps of receiving, a first lead contact detail, via the customizable form; and receiving, a second lead contact detail, via the customizable form, wherein the first lead contact detail and the second lead contact detail are received in different instances. In yet a further embodiment, the method further comprises the steps of presenting, via a user interface, a plurality of fields and a plurality of inputs to the card owner, wherein each of the plurality of fields corresponds to one of the plurality of inputs; and receiving, via the plurality of inputs, a plurality of values, wherein the contact details of the card owner are comprised of the plurality of values.

BRIEF DESCRIPTION OF THE DRAWINGS

A complete understanding of the present embodiments and the advantages and features thereof will be more readily understood by reference to the following detailed description when considered in conjunction with the accompanying drawings. The incorporated drawings, which are incorporated in and constitute a part of this specification exemplify the aspects of the present disclosure and, together with the description, explain and illustrate principles of this disclosure.

FIG. 13 illustrates an embodiment of a members interface within a team module.

FIG. 15 illustrates an embodiment of a settings interface within a team module.

FIG. 16 illustrates an embodiment of a show and lock interface within a team module.

DETAILED DESCRIPTION

Figure 1:
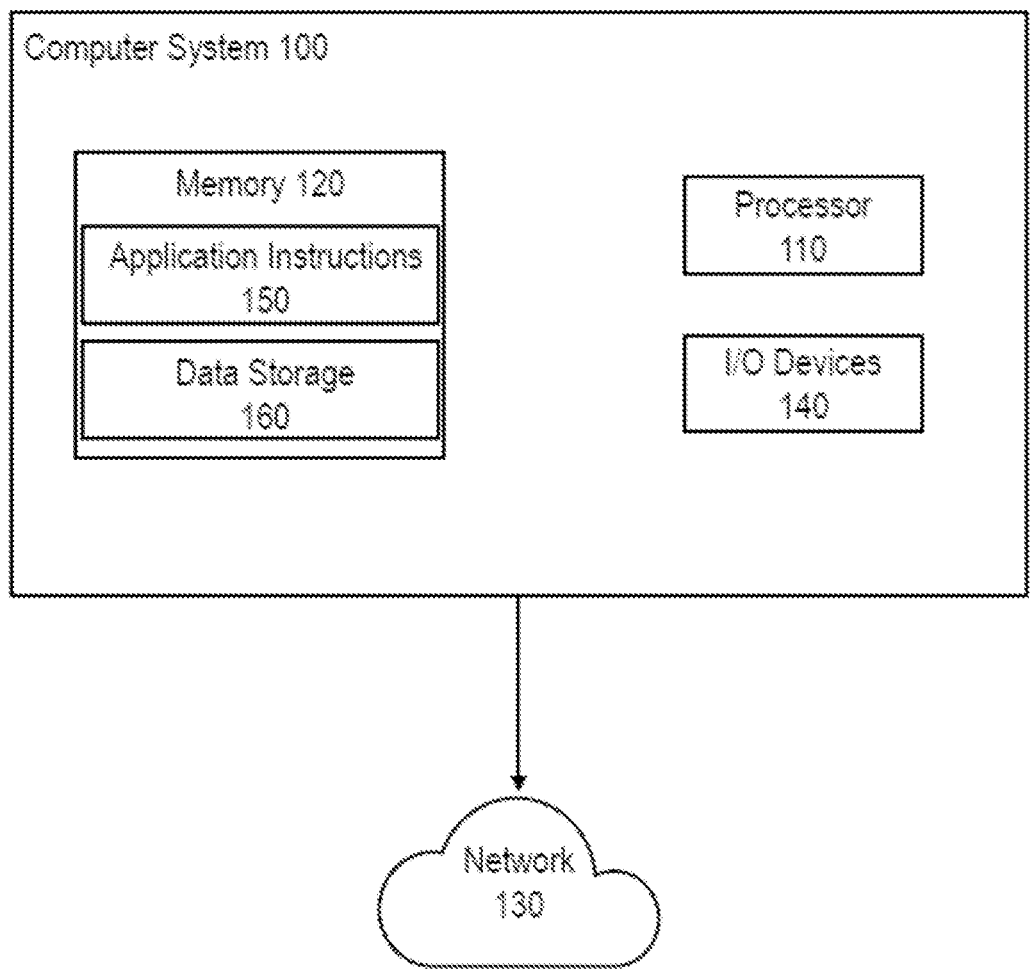
FIG. 1 illustrates a block diagram of the network infrastructure, according to some embodiments.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

The specific details of the single embodiment or variety of embodiments described herein are to the described system and methods of use. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to systems and methods for providing an electronic business card and client relationship management (CRM) system. The electronic business card may be selectively integrated with marketing tools, provide control over the transmittal of information, and may include oversight tools which allow employers to oversee employee interactions and production therefrom. Further, the system includes a lead generation system associated with the electronic business card. The lead generation system provides an automated or semi-automated system for connecting and communicating with a business lead to turn a connection into a customer.

In some embodiments, the electronic business card may take the form of a traditional business card having near-frequency communication (NFC) capabilities to permit the interface between the NFC-enabled business card and an NFC-capable computing device (e.g., a smartphone). The electronic business card may also include a QR code which can be used if the smartphone is not capable of NFC protocols. In such an embodiment, the QR code may be encoded such that scanning the QR code may induce the same or similar processes as if the computing device had interacted with the NFC. Alternatively, the electronic business card may include any visual machine-readable image.

In some embodiments, the electronic business card may be constructed of plastic, wood, metal, or other suitable material. The electronic business card may be customized by the user to include various colors, design (e.g., a business logo, imagery, portrait, etc.) as is known in the arts. Some materials may allow for engraving, embossing, or other forms of display writing or imagery provided on the electronic business card.

In some embodiments, the electronic business card may be constructed as an object, such as a key fob, smart button, sticker, or another object. It may be preferred that the object is a daily-use object such that the object is always carried on the user's person and can be readily deployed.

In some embodiments, the electronic business card is not a physical object, but rather a virtual business card. For example, the electronic business card may be an image or rendering of a business card generated on the display of a smartphone. Accordingly, an inquiring party may scan a QR code via the display of the device. Alternatively, the device presenting the virtual business card may utilize various components or technologies of the underlying device to initiate communication with the desired party (for example, Bluetooth®).

FIG. 1 illustrates a computer system 100, which may be utilized to execute the processes described herein. The computer system 100 may be comprised of a standalone computer or mobile computing device, a mainframe computer system, a workstation, a network computer, a desktop computer, a laptop, or the like. The computer system 100 may include one or more processors 110 coupled to a memory 120 via an input/output (I/O) interface. Computer system 100 may further include a network interface to communicate with the network 130. One or more input/output (I/O) devices 140, such as video device(s) (e.g., a camera), audio device(s), and display(s) are in operable communication with the computer system 100. In some embodiments, similar I/O devices 140 may be separate from computer system 100 and may interact with one or more nodes of the computer system 100 through a wired or wireless connection, such as over a network interface.

Processors 110 suitable for the execution of a computer program include both general and special purpose microprocessors and any one or more processors of any digital computing device. The processor 110 may receive instructions and data from a read-only memory or a random-access memory or both. The essential elements of a computing device may be a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

A network interface may be configured to allow data to be exchanged between the computer system 100 and other devices in communication with a network 130, such as other computer systems, or between nodes of the computer system 100. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 120 may include application instructions 150, configured to implement certain embodiments described herein, and a database 160, comprising various data accessible by the application instructions 150. In one embodiment, the application instructions 150 may include software elements corresponding to one or more of the various embodiments described herein. For example, application instructions 150 may be implemented in various embodiments using any desired programming language, scripting language, or combination of programming languages and/or scripting languages (e.g., C, C++, C#, JAVA®, JAVASCRIPT®, PERL®, etc.).

The steps and actions of the computer system 100 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

Figure 2:
FIG. 2 illustrates a schematic of the electronic business card, according to some embodiments.

FIG. 2 illustrates an exemplary electronic business card 200 having a plurality of information thereon. For example, the electronic business card can include the user's name, contact information, business affiliation, professional position, social media links, logos, and other information which is customizable by the user. While the illustrated example shows a traditional business card format, one skilled in the art will readily understand that the business card may be constructed of various materials and be provided in various sizes, shapes, and configurations. Further, for the purposes of this disclosure, the plurality of information on the electronic business card 200 should not be construed as a limit to the categories of data transferred to the recipient's device. For example, the communication between the electronic business card 200 may transmit information or induce actions within the recipient's device not represented on the face of the business card 200. Accordingly, the communication between the electronic business card 200 and the recipient's device may transmit more information or induce more actions within the recipient's device than represented on the face of the business card 200. In an alternate embodiment, the electronic business card 200 may include no information physically disposed on the face of the card 200.

During use, the user may position and/or proximally interface the electronic business card near or touching an NFC-capable computing device to transmit the information associated with the business card thereto. The information may then be transmitted to one or more third-party systems, such as a CRM system, contact management application, social media application, webpage, media stream, etc. A virtual card (vCard) may be generated having the information associated with the electronic business card 200 (e.g., contact details, company details, social links, etc.). Similarly, a QR code may initiate the above response.

In some embodiments, the recognition of the electronic business card may initiate a customizable response, such as by transmitting the recipient to a vCard file, digital business card interface, lead generation system, CRM system, link to a website or social media profile, etc.

Figure 3:
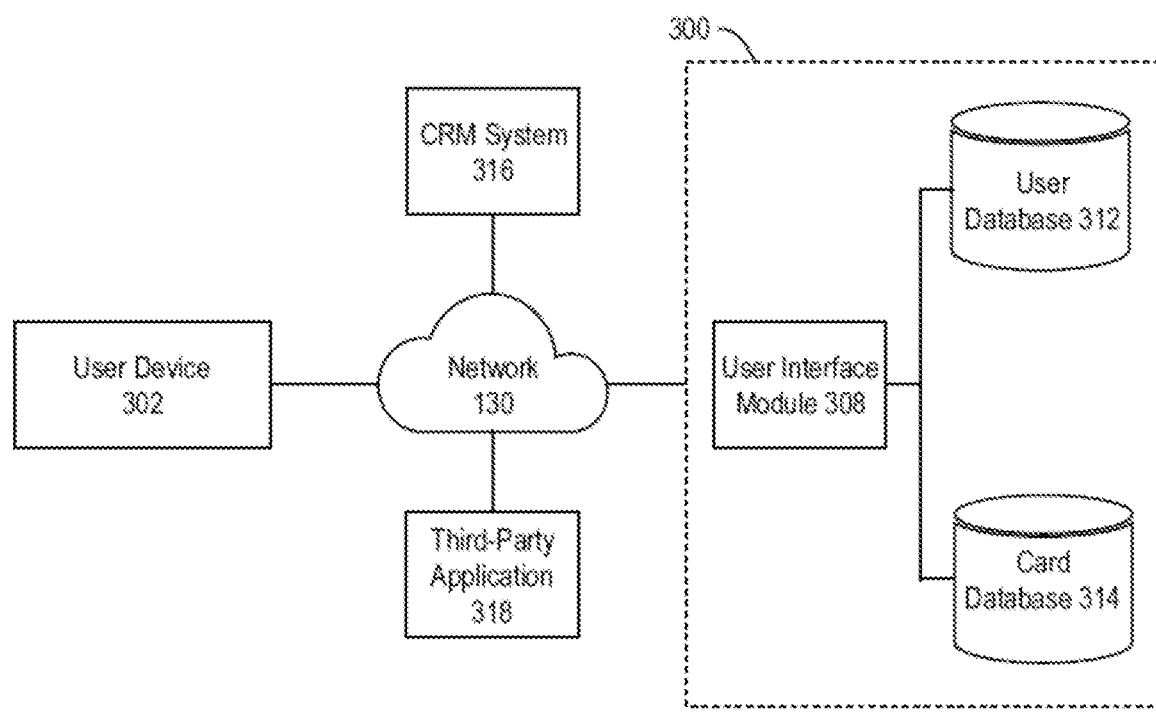
FIG. 3 illustrates a block diagram of the application system, according to some embodiments.

FIG. 3 illustrates a block diagram of the application system 300. Once the information from the electronic business card is captured by the user device 302, the information is transmitted via the network 130 to the application system 300 having a user interface module 308 in operable communication with a user database 312 and a card database 314. The user database 312 stores information associated with each user of the application, such as their contact information, associated business information, and their user preferences. The user preferences may include a selection of an external link to which the recipient of the card is directed. For example, the external link may transmit the recipient to a webpage, social media page, media outlet, vCard file, etc. The card database 314 stores electronic business card information for each user of the system. A CRM system 316 or other third-party application 318 may be in communication with the network to connect the information stored in the user database 312 and card database 314 thereto. This allows further functionalities to be employed. For example, the network 130 may be configured to direct data from the databases 312/314 to the third-party application 318, such that said data may be displayed to the recipient within the third-party application 318, utilizing the interface of the third-party application 318. The network 130 may be configured to enable indirect communication between the recipient's device and the application system 300. In such an example, the network 130 may act as a bridge between the recipient's device and the application system 300 such that the recipient's device and the application system 300 may communicate indirectly.

In some embodiments, the CRM system 316 can provide various functionalities commonly associated with CRM tools in the art. For example, the CRM system 316 may permit sales funnel monitoring, lead tracking, defined steps in the sales process, text and email sequences, advertisements, link tracking and reporting, data enrichments, or other relevant utilities.

In some embodiments, the application system 300 provides data and reporting functionalities such as real-time location data, QR code sharing directly from the application interface, link sharing, card management, lead management, and automation capabilities.

Figure 4:
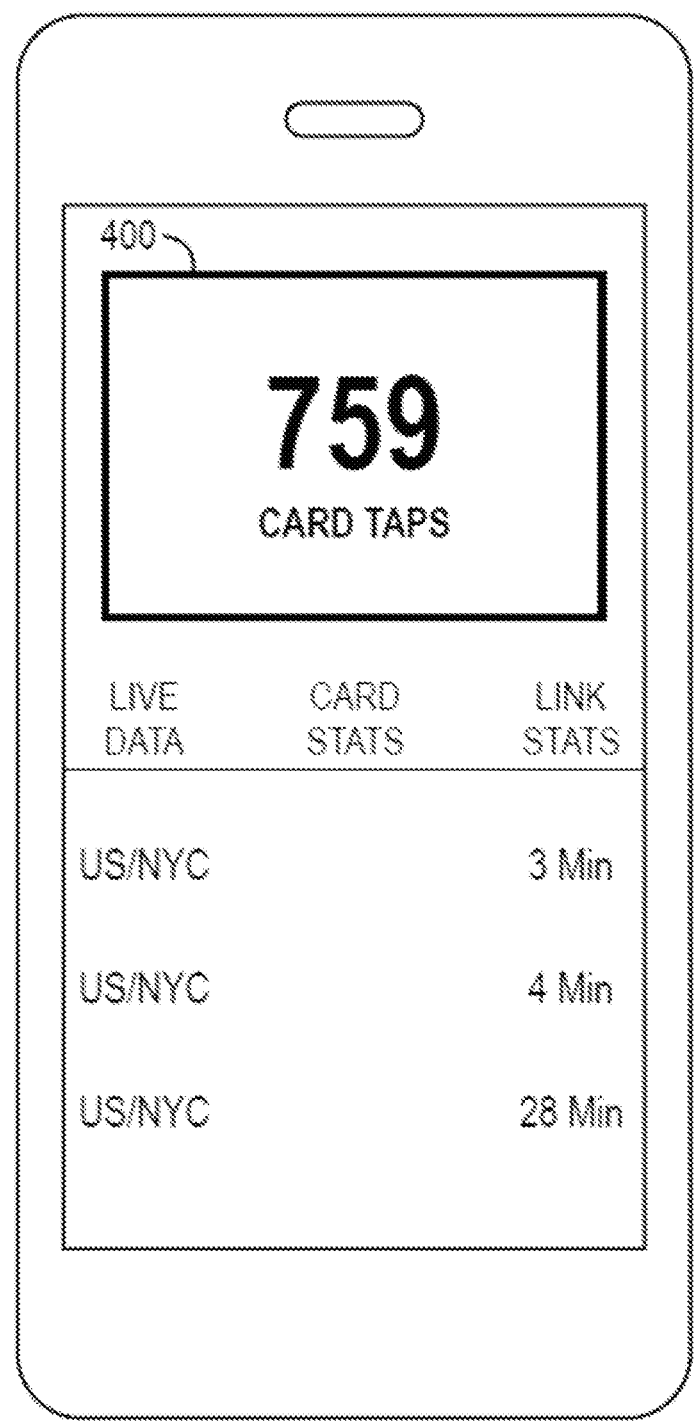
FIG. 4 illustrates a screenshot of the card information interface, according to some embodiments.

FIG. 4 illustrates a screenshot of the card information interface 400, wherein the user (i.e., the card owner) can view their usage metrics of their card. For example, the user can view the number of card taps (i.e., how many times they "handed out" their business card to recipients), the location of their interactions, how the recipient interacted with their information or associated links, and other card statistics. This allows the user to view how recipients interact with their information to allow the user to customize information associated with their card. The card information interface 400 may display information from and/or be in electronic communication with the application system 300.

Figure 5:
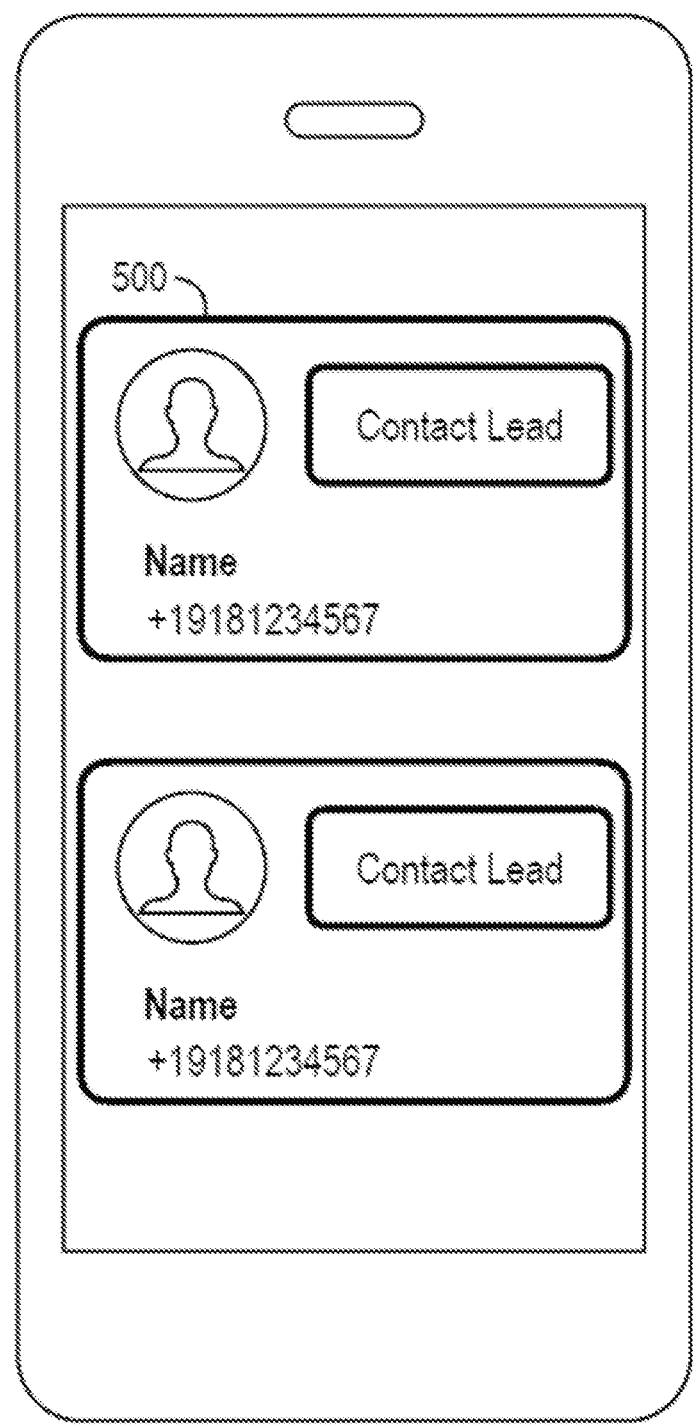
FIG. 5 illustrates an embodiment of a lead interface.

FIG. 5 illustrates a screenshot of the lead interface 500 comprising a plurality of leads which the user has acquired. The lead interface 500 allows the user to search through leads and interact with lead information stored in the database. The user may also select to contact a lead which allows the user to call, text, email, or otherwise communicate with the lead. In some embodiments, the user may select to automatically contact leads. For example, the user may select to transmit an email to one or more of their leads. In one example, the email may include a preselected question. The preselected question may be set by the user and/or administrator via a suitable interface (for example, a settings interface or profile interface) within the user interface module 308.

Figure 6:
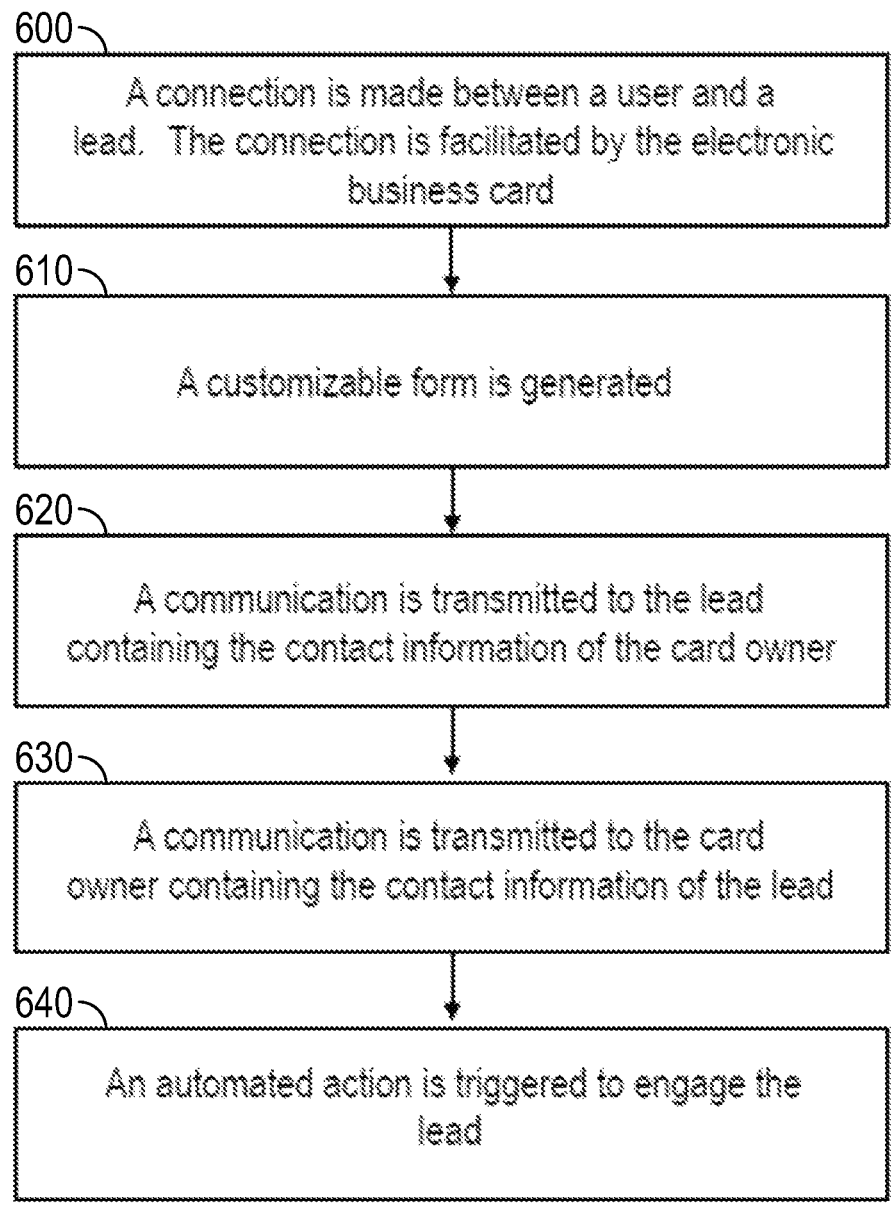
FIG. 6 illustrates a flowchart of a method for generating a lead, according to some embodiments.

FIG. 6 illustrates a flowchart for a method for generating a lead using the embodiments described herein. In step 600, a connection is made between a user and a lead, wherein the user transmits information associated with the electronic business card via NFC protocols or by scanning a QR code using a computing device. In step 610, a customizable form is generated and provided. The form is filled out to capture and aggregate contact details or other information. In step 620, a communication (e.g., a text message) is transmitted to the lead. The communication may include contact details of the card owner (user). In step 630, a communication is transmitted to the card owner (user) containing the contact details or other information associated with the lead. In step 640, an automated action is triggered which may be engaged with by the lead. The automated action may be a text message, call, email, media, website link, or a call-to-action from the lead.

In some embodiments, the system includes an administrative panel to permit an administrative user to interact and change various functionalities of the system as well as the functionalities of each electronic business card. For example, the administrative user may select permissions for each card and/or each user. The administrative user may associate information with each card, such as by associating a website address with every card within a group (i.e., every employee who is assigned a card will be assigned a webpage to which their card links). The administrative user may also view statistics at an individual and/or enterprise level to interpret interactions, assess productivity, etc.

In some embodiments, productivity is assessed via a "card taps" icon which counts the number of times an electronic business card or group of electronic business cards has been shared. In such, the administrative user can assess productivity on the individual, group, and enterprise levels. The administrative panel may also monitor the information shared during each "card tap", such as how many times a social media link was shared or how many times contact information was shared. Further, this feature may monitor leads which have been engaged with via the lead generation system.

Information shared with each user's electronic business card may be controlled by a control panel. In such, the administrative user may select information (contact information, links, etc.) which are shared each time a user shares their electronic business card. For example, the administrative user selects for each user within an enterprise to share their contact information and company website when their electronic business card is shared.

The administrative panel can include a link tracking feature to allow the system to track interactions with links associated with the electronic business card. The link tracking feature may be toggled between ON/OFF functions to track or turn off link tracking. As a non-limiting example, the application system 300 may be notified by a recipient's device when a link is accessed. Such communication may include a means of identifying the recipient and/or the recipient's device. In another non-limiting example, the application system 300 may be notified by a website's server or via a third-party application's API when a recipient interacts with a corresponding link. In such a non-limiting example, said communication may include the IP address or other identifying information related to the link's access, allowing the application system 300 to determine which recipient accessed the link.

In some embodiments, each card is associated with a user of the application system. The card can be removed from the users account and reassigned to another user. This allows the card to be shared between users as needed. An administrative user may assign cards to a group of employees.

In some embodiments, the CRM system may include a native CRM system within the application system or may be integrated with a third-party CRM system. This allows users to manage contacts, interactions, and information thereof.

Figure 7:
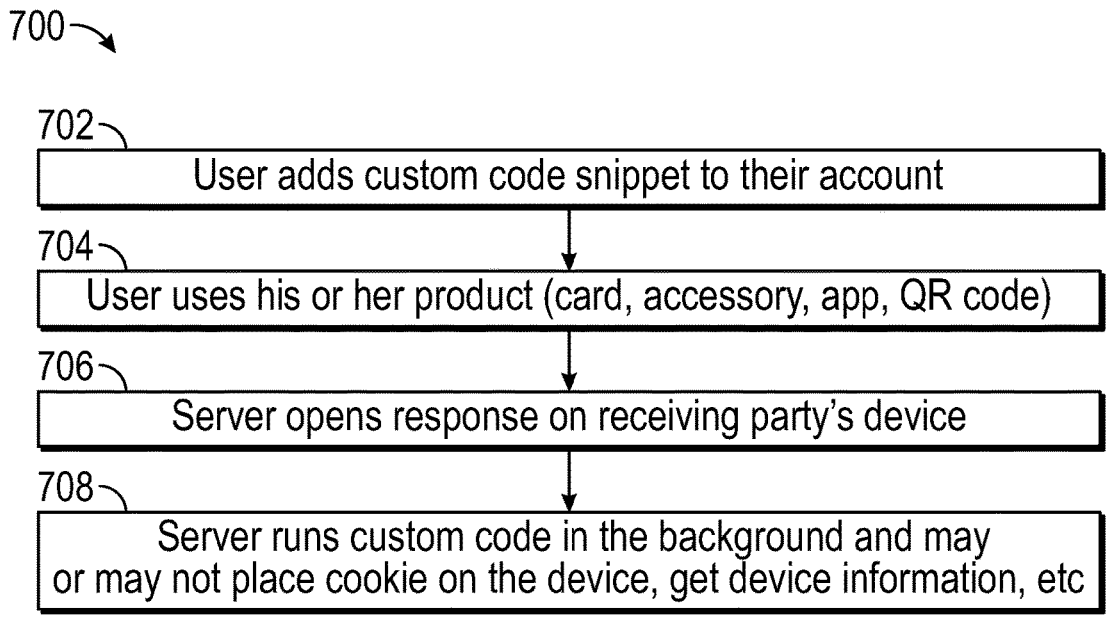
FIG. 7 illustrates a flowchart of a method of running targeted marketing to contacts, according to some embodiments.

FIG. 7 illustrates a flowchart 700 of a method of running targeted marketing to contacts, according to some embodiments. This targeted marketing can include the use of custom code inclusion and integration with the system. A custom code inclusion feature may allow the system administrators and/or other designated parties to add one or more custom code section(s) or snippet(s) to their account for added functionality as a first step 702. For example, an administrator may add the code snippet via the team module (for example, a profile interface, an integrations interface, and/or a settings interface). After the custom code has been added and/or activated, in step 704 the organization's employees may use their system products (e.g. NFC card, NFC accessory, system application installed on a smartphone or tablet, QR code, or others). Next, in step 706, the system can open the selected response on an associated device (as set up in the account settings, which can include opening a business card mode, personal landing page, social profile mode, link to a specific URL, lead generation mode, or others); the system server can also execute the code section(s) or snippet(s) on the receiver's device. This may result in a number of different actions or operations as programmed into the code snippet. For example, in a next step 708, one or more of the following may be initiated: third party (e.g. Google Analytics or others) tracking; device data relaying, use, monitoring, tracking, or others; placing a cookie on the device; begin tracking data, such as hardware information or location data; firing a pixel (i.e. generating a click ID, wherein the Click ID is a special number, which is created when a future client clicks on an affiliate link and may also be fired when a sale or transaction is generated.) for marketing; re-marketing; and others.

Certain data mining, machine learning, and/or AI can be utilized and/or be employed by the system in various embodiments, in order to aid in targeted marketing operations. This information may be gleaned or acquired in many different fashions, including by acquiring and storing information from a contact's virtual business card through field parsing, optical character recognition (OCR), or otherwise. Using such information, marketing groups can be created automatically and/or manually edited and updated by system administrators and/or subscribers and contacts can also be added manually in various embodiments. In some embodiments this may occur using prompts, suggestions, or other user interface interaction on a user device of the administrator or subscriber. The data mining aspect may be processed on the system server and may be made available to the user and/or administrator. For example, information derived from data mining may be displayed on any of the various user interfaces. Said information may be further processed via machine learning and/or AI to, for example, generate suggestions on marketing action points.

As a first example, business titles, occupation information, roles, and interests can be used to market particular products and/or services to contacts based on their occupation or field, or leisure activity interests (e.g. dentistry, law, cardiac surgery, sales, construction, engineering, manufacturing, cosmetology, gardening, and many others). Similarly and on a related note, seniority information can be used to market particular products and/or services to contacts based on how novice or experienced they are in a particular field. Background information such as high schools, universities, and other educational information can also be used to greater or lesser effect. For business to business or service industry contacts, it can be useful to gather information about what industries the contact is known to service or has done business with in the past. Further useful information can be gleaned from any notes that a particular system subscriber or administrator has entered into a contact profile about the contact.

Geolocation information can be used to market goods or services based on where a contact has been in the past, is currently located, later moves to, and/or is expected or predicted to go. This may help predict contact needs or desires, alone or in combination with other information (e.g. climate/weather, frequent modes of transportation, commonly engaged in activities, etc.). In such an embodiment, the code snippet may be configured to induce communication between the recipient's device and the network 130. Accordingly, information gathered from the recipient's device may be integrated, processed, and/or analyzed by the CRM system 316, a third-party application 318, and/or the application system 300.

Temporal information can be used to market goods and/or services at particular times and/or on particular days or ranges of days. Other types of temporal information can also be used, such as the amount of time between when a client was first met and when a follow up message was sent or when the contact was last contacted. Furthermore, machine learning may discover that certain times of day receive better or more timely responses from contacts than others, and marketing algorithms can take full advantage of this fact.

Purchases, searches, clickthroughs, and related information may also be used by the marketing system. This information can be useful in trying to tailor, imitate, or replicate the types of advertisements or marketing information to the contact that may have been successful in inducing the contact to purchase or at least attracting the contact's information in the past.

Political leanings, demographic information, family information and other related information can also be useful in certain instances. Second and/or third hand contacts and real life and virtual interaction monitoring can be used by the system in some instances to train models as to potential marketing data. In an embodiment, personal information, such as demographic information, may be determined by introducing machine learning algorithms and/or AI to information collected by the code snippet(s).

While the examples described previously have focused on positive or affirmative actions taken by the contacts, it should be understood that negative or omitted information can also be used for modeling and marketing. For example, if a particular user never visits a particular place, purchases a type of product, interacts with a type of media, or communicates with a particular person, despite having ample opportunity and even encouragement to do so, it may be inferred that the person has a dislike or distaste therefore. Thus, if a person never watches action movies, never visits the grocery store closest to them, or never is in close proximity to a particular coworker, it may be inferred that the person actively avoids them in some instances. While this type of negative inference may be less accurate than positive inferences in some instances, it may provide unique insights or marketing opportunities or manners of marketing to be avoided in other instances.

It should be understood that some or all of the marketing information described in the preceding description can be stored and arranged in particular manners in one or more databases. Such information can be referenced and cross-referenced in any number of manners and robust profiles can be kept on contacts who may be system subscribers themselves or who may not be. Third-party database integration can also be provided in various embodiments. In some embodiments this may be collaborative, whereby the system pays or has other arrangements with database maintainers, while in some embodiments system subscribers may provide their own database information and the system can access it via a network or provide an overlay therefore.

Different levels of access can be provided for different subscriber levels, some of which may provide more robust and in-depth insights than others. Basic marketing campaign levels may be more cost effective for solo or small enterprise subscribers, while deep learning campaigns may be reserved for the most high level subscribers. In some embodiments, semi-customized customized or fully customized campaigns can be crafted with highly trained and experienced system support staff. The various level of access may be dictated by a number of classes of users, for example, personal card owners, team card owners and employees, and/or team card owners and administrators. Personal owners may have access to the app, user interface, and their own profile. The team card owners and employees may have access to the app and their profile, but may have limited access to features within the app and/or user interface. The team card owners and administrators may have access to the app, user interface, their own profile, and/or an additional or separate set of interfaces for team and organization management. For the purposes of this disclosure, the "app" may refer to the interface and/or program configured to run on a user's device, wherein the app may be in electronic communication with the network 130 and/or the application system 300.

Various opt-in and opt-out preferences may be provided for system subscribers, contacts, and members of the public in various embodiments. In some embodiments, businesses who are not system subscribers can be provided one or more levels of control over the type and amount of data that the system can use in creating and maintaining profiles on its employees and the business itself.

In various embodiments, the system can generate reports and/or suggest particular tasks for review by system subscribers/administrators based on learned information about contacts they have made. In some embodiments this can include using modeling based on large scale modeling of similar types of people and interactions that the system has stored and/or is accessible to the system. In some embodiments this can be specific and directed solely at efforts and interactions between the particular parties involved, namely the subscriber and the contact.

Marketing campaigns that can be run through the system are varied and may comprise any number of different elements, features, options, and components. Timing in the form of scheduling and timers, sales prices, service levels, repeat actions, followups, revisions, cross promotions, and numerous others are contemplated. Success and failure metrics can be maintained and updated by the system on an ongoing basis in order to continually train and improve marketing campaign results.

Insights and suggestions may be automatically flagged and/or displayed to system subscribers in some instances upon connection with a contact, the next morning, or at other times when appropriate and according to preprogrammed rules. For example, indications that a person has an upcoming birthday as a reminder to send well wishes, an indication that a contact has recently made a connection with someone common to the system subscriber, an indicator that the contact is searching a new product or service or has recently made a number of large purchases may be provided to the system subscriber with a suggestion that the subscriber engages in a particular action or should reach out to the contact. Automated nudges can also be included.

Figure 8:
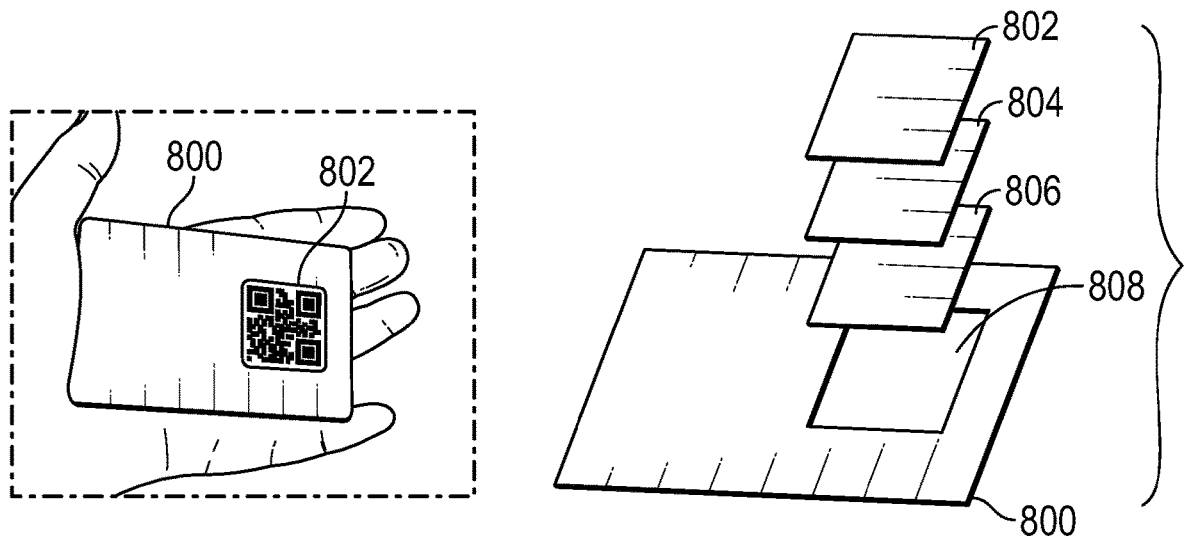
FIG. 8 illustrates a schematic of the electronic business card, according to some embodiments.

Referring to FIG. 8, in one embodiment, the card 800 may be composed of metal. The card 800 may include a QR code sticker 802, an NFC chip 804, and/or a ferrite base 806. The NFC chip 804 and/or antenna may be disposed beneath a sticker (for example, the QR code sticker 802). Further, the NFC chip 804 may be glued to the ferrite base 806 (for example, an anti-magnetic material). The QR code sticker 802, NFC chip 804, ferrite base 806, and/or a CNC milled slot 808 may be sized such that the ferrite base 806 and the NFC chip 804 fit within the CNC milled slot 808. Additionally, the QR code sticker 802 may be sized such that the sticker 802 partially adheres to the surface of the card 800 (for example, the immediate perimeter of the CNC milled slot 808) and retains the NFC chip 804 and ferrite base 806 within the CNC milled slot 808. The CNC milled slot 808 may be a cavity disposed on one surface of the card 800 configured to accept at least the NFC chip 804 such that the QR code sticker 802 rests flush with the surface of the card 800.

The NFC chip 804 may be configured to initiate contactless transmission of information and/or receive and/or supply energy. The operating distance of the NFC chip 804 may be dependent on the recipient's device, however, the operating distance may be any suitable distance (for example, 10 cm) such that a user may proximally interface the electronic business card 800 with the recipient's device. Further, the operating distance may fluctuate depending on the materials disposed between the recipient's device and the NFC chip 804. For the purposes of this disclosure, the operating distance may be defined as the maximum distance where the recipient's device's RF field may induce a suitable current within the NFC chip 804. The NFC chip 804 may be configured to any suitable input capacitance (for example, 50 pF). In an embodiment, the NFC chip 804 may include an ASCII mirror configured to add the NFC chip 804 identification information or other value to an NFC Data Exchange Format (NDEF) message. The NFC chip 804 may include a memory, such as an electrically erasable programmable read-only memory (EEPROM). The EEPROM may be configurable by a user or administrator such that the user or administrator may erase and/or reprogram the stored data. In such an embodiment, the NFC chip 804 and the components thereof, may be password protected. For example, an individual having the correct password or key may be permitted to reprogram the NFC chip 804.

The NFC chip 804 may comprise an integrated circuit and an antenna. Further the NFC chip 804 may comprise an RF-interface and a digital control unit, wherein the digital control unit may comprise an anti-collision component, an EEPROM interface (or other suitable memory interface), and a command interpreter component. The RF interface may be configured as a modulator, rectifier, clock regenerator, power-on reset, and/or voltage regulator. The command interpreter component may include processor functionality, for example, configured to process memory access commands. The anti-collision component may be an electrical component configured to enable the selection and management of multiple NFC chips 804.

The NFC chip 804 may be configured to transmit data when within an operating distance of the recipient's device, wherein the recipient's device is NFC-enabled and configured to generate an RF field. The RF field generated by the recipient's device may initiate both communication between the NFC chip 804 and the recipient's device, and power the NFC chip 804. The NFC chip 804 may be configured to communicate with the recipient's device via inductive coupling. Accordingly, the recipient's device may generate a magnetic field (for example, by passing current through a coil within the recipient's device). The magnetic field generated by the recipient's device may be captured by the antenna and may induce a current within the NFC chip 804. This aforementioned process may be referred to herein as the handshake. The induction of current within the NFC chip 804 (or handshake) may enable the NFC chip 804 to transmit data to the recipient's device. The NFC chip 804 may transmit a RF (for example, an instructive RF) to the recipient's device, wherein the instructive RF is encoded with information configured to initiate an action in the recipient's device. For example, the instructive RF may be encoded with the user's personal URL or with a call to open a particular application on the recipient's device. In effect, the instructive RF may be configured to carry out the user and/or administrator's preferred actions as determined and set by the user and/or administrator in the user interface. Thus, the user and/or administrator's preferred settings may be stored within the NFC chip 804 memory unit (for example, the EEPROM), to be transmitted upon the proximal interfacing of the NFC chip 804 and recipient's device.

In an embodiment wherein the card is composed of plastic, the NEC chip 804 and/or antenna may be cast within plastic. Accordingly, the plastic may be molded or otherwise hardened around that NFC chip 804 and/or antenna. In such an embodiment, the card may further comprise a OR code sticker 802 and/or a ferrite base 806. The plastic may be any suitable color and/or opacity. For example, the card may be transparent. In an embodiment wherein the card is composed of wood, the NFC chip 804 and/or antenna may be disposed between two or more wood panels. The two or more panels may be sufficiently thin to maintain the standard business card size, yet thick enough to provide suitable rigidity. The two or more wood panels, NFC chip 804, and/or antenna may be fastened via an adhesive. One or more of the panels may comprise a milled portion sized to accept at least the NFC chip 804, such that the two panels interface in a flush manner with the NFC chip 804 disposed between.

The electronic business card may be any suitable dimensions and/or weight. For example, the business card may be sized to be accepted by a user's wallet, pocket, and/or money clip. In one embodiment, the business card may abide by the ID-1 format (a length and width of 85.60 mm×53.98 mm and rounded corners having a radius of 2.88-3.48 mm). However, the business card may abide by any standardized card-sizing metric, for example, ID-2, ID-3, or ID-000. Similarly, the card may be of any suitable thickness, such that the NFC chip 804 is uninhibited in wireless communication.

Figure 9:
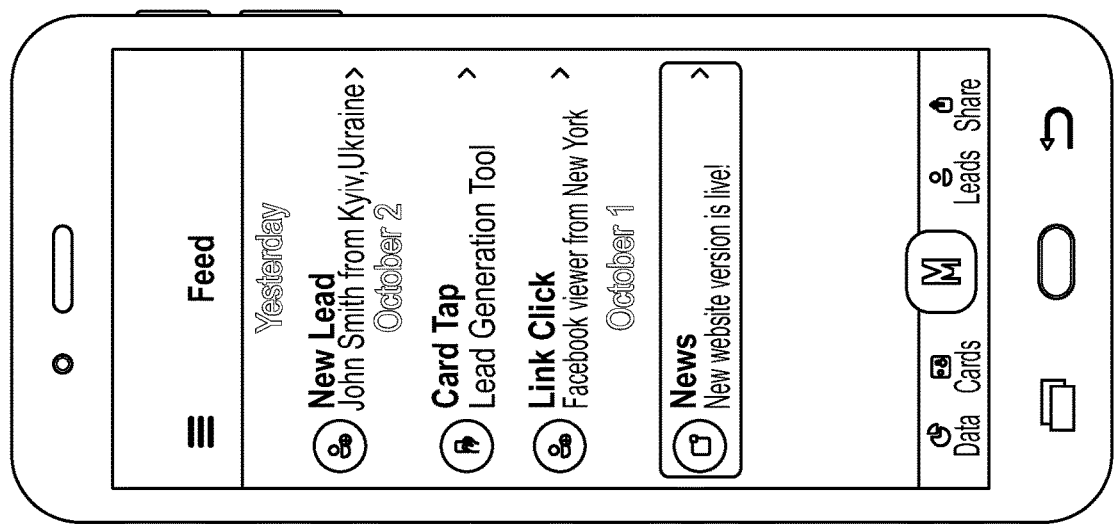
FIG. 9 illustrates an embodiment of a feed interface.

Referring to FIG. 9, the system may include a feed interface. The feed interface may provide live updates on when and how the card is being used. Thus, in order to retrieve such information, the feed interface may be in electronic communication with the network 130 and/or the application system 300. Further, the feed interface may display the recipients who have since interacted with the user's contact details after said contact details were saved on the recipient's device. As shown in FIG. 9, the feed interface may be sorted chronologically. In such an embodiment, interactions, such as new leads or link clicks, may be grouped as a function of their temporal occurrence. The feed interface may present interactive buttons to the user, wherein actuation of each of the buttons provides additional information. The feed interface may display new leads, card taps, link click, and/or internal system news and updates. Each button may include a title, for example, "Link Click," and a subtitle, for example, "Facebook viewer from New York," wherein the subtitle provides a preview or summary of the interaction. In one embodiment, a button disappears from the feed interface after the user has clicked said button. Accordingly, the feed interface may display unread or undiscovered interactions. Once an interaction is read by the user, it may be removed from the feed interface, and, optionally, archived.

Figure 10:
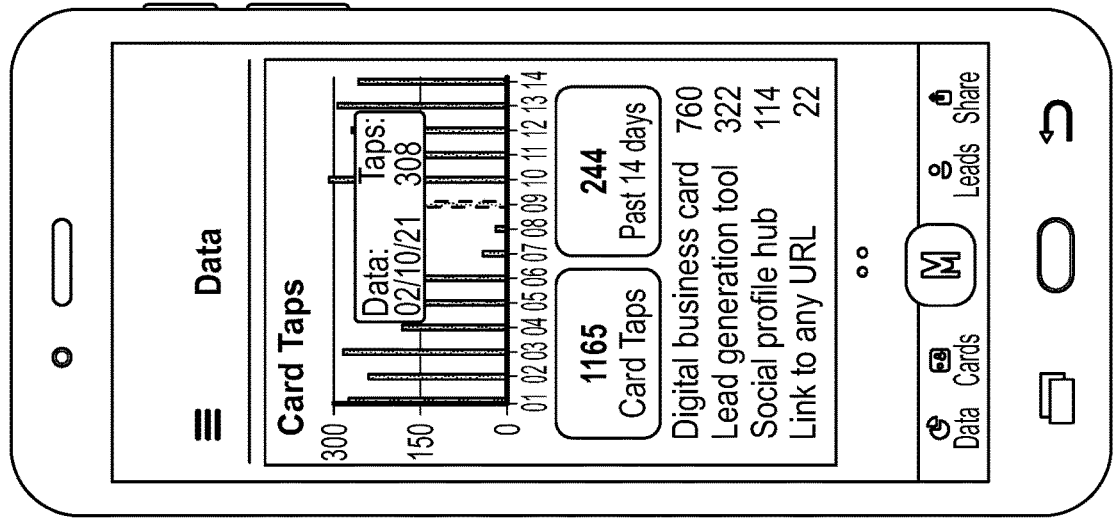
FIG. 10 illustrates an embodiment of a data interface.

Referring to FIG. 10, the system may include a data interface. The data interface may provide live updates on the various metrics pertaining to use of the user's electronic business card. Accordingly, the system may draw information from the network 130 and/or the application system 300 to populate the data interface. The data interface may include a visual representation of the frequency of card taps. For example, a graph may be generated based on the number of card taps per day. The graph may include interactive elements (for example, each of the "bars" of a bar graph). Upon clicking an interactive element, a pop-up or other presentation of data may be generated and displayed. As a non-limiting example, interaction with an interactive element may provide a pop-up displaying a particular date and the corresponding number of clicks. However, the interactive elements and underlying graph or chart may include any information retrieved from the network 130 and/or application system 300.

Further, the data interface may include a counter of card taps. Such a counter may include all card taps recorded since activation of the electronic business card. Also, the data interface may include a reduced timeframe counter; for example, a counter tracking card taps over a predetermined time period, such as 14 days. In a further embodiment, the data interface may comprise a mode table, wherein the mode table displays one or more modes and the corresponding frequency of taps per mode. For example, the mode table may display "digital business card," "lead generation tool," "social profile hub," "link to any URL," any other mode, and/or the corresponding number of taps per mode. In an embodiment, a particular card may be pre-programmed for "digital business card" mode. However, the administrator may adjust any particular card to any suitable mode. For example, such adjustments may be made by the administrator via the settings interface. Each mode may be configured to induce different actions in the recipient's device. For example, the social profile hub mode may cause or prompt the recipient's device to connect with the user's social media profiles.

Figure 11B:
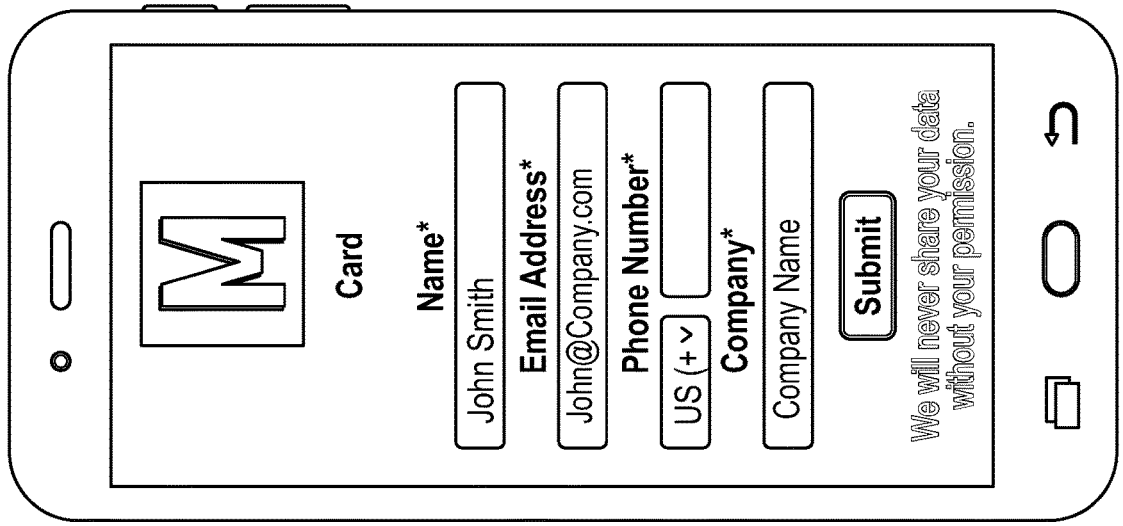
FIGS. 11A-11B illustrate embodiments of a lead collection interface and an enriched lead collection interface.
Figure 11A:
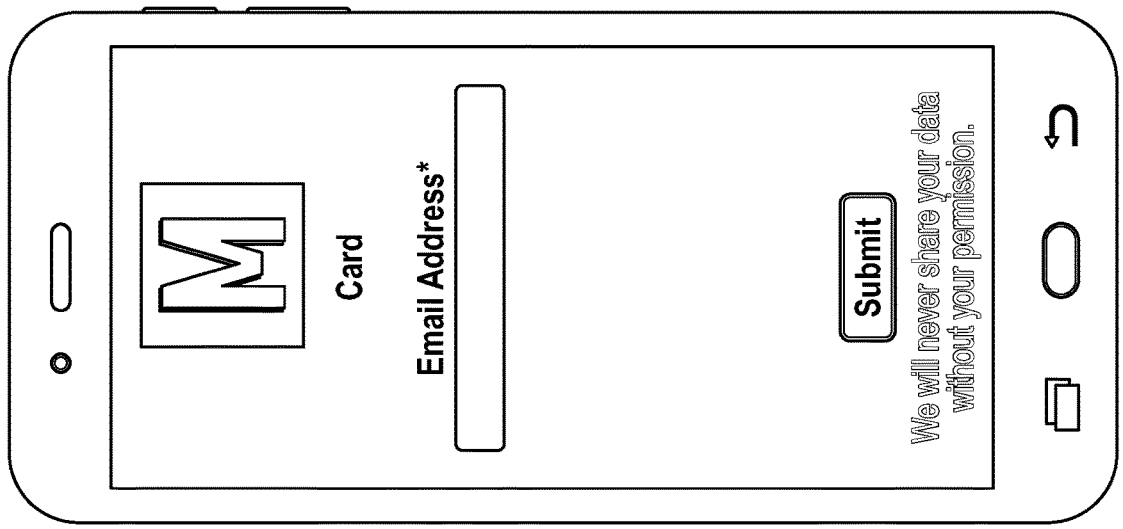

Referring to FIGS. 11A and 11B, the system may include a lead collection interface and an enriched lead collection interface, respectively. The lead collection interface may be displayed on the lead's device after the user's electronic business card interfaces with the lead's device (for example, via NFC communication). The lead collection interface may include a prompt requesting the lead's email address, a text box, and a selectable submit button. Upon submission, the lead's email address may be transmitted to the network 130, application system 300, and/or the user's device. After submission of the lead's email address, as shown in FIG. 11B, the lead's device may present an enriched lead collection interface. The enriched lead collection interface may prompt the user for additional information via text boxes, drop down menus, or other information entry tools. For example, the enriched lead collection interface may include prompts and text boxes for name, email address, phone number, and/or company. Upon submission of the enriched lead collection interface, the collected information may be transmitted to the network 130, application system 300, and/or the user's device. Further, a text message may be sent to the user, wherein the text message includes the information collected via the lead collection and enriched lead collection interfaces. Similarly, based on the user's profile and settings, a text message may be delivered to the lead's device, wherein said text message includes the user's information. In a further embodiment, the lead's information may be transmitted to a third party application, program, or data store.

The presentation of the lead collection interface may precede the enriched lead collection interface. Thus, as the lead collection interface includes fewer prompts than the enriched lead collection interface, the lead may be less burdened in completing the lead collection interface. Accordingly, the system may secure the lead and, at least, receive the email address of the lead, before prompting (in the enriched lead collection interface) the lead for additional information.

Figure 12:
FIG. 12 illustrates an embodiment of a lead interface.

Referring to FIG. 12, the system may include a lead presentation interface configured to display the leads associated with a particular user. The lead presentation interface may display said leads on the user's device. Each of the leads may include the lead name, the status of the lead, the lead location, or any other suitable information. Further, the leads may be presented in visually distinct virtual cards, such that the leads are 'selectable' via the user's device. The lead virtual cards may include a detail button configured to present additional details to the user when the detail button is selected. In a further embodiment, each virtual lead card may include a favorite button, wherein the user may flag one or more leads. For example, each virtual lead card may include a selectable icon, such as a heart, where the selectable icon has an unselected state and a selected state. Selection of the selectable icon (for example, via a touch screen or 'click') may convert the selectable icon from an unselected state to a selected state and vice versa. Further, leads in the selected state may be aggregated on the server and/or locally as "favorite" leads. In yet a further embodiment, a "favorite" lead may be notified by the system, for example, via the lead's device, of the lead's "favorite" status.

The system may include a team module (also referred to as an "administrative panel") available to the user and/or administrator. The team module may be in communication with the network 130 and/or application system 300, such that the team module may be populated with up to date user and lead information. The team module may comprise one or more selectable interfaces, for example, a members interface, a profile interface, a data interface, an integrations interface, and/or a settings interface.

Figure 13:
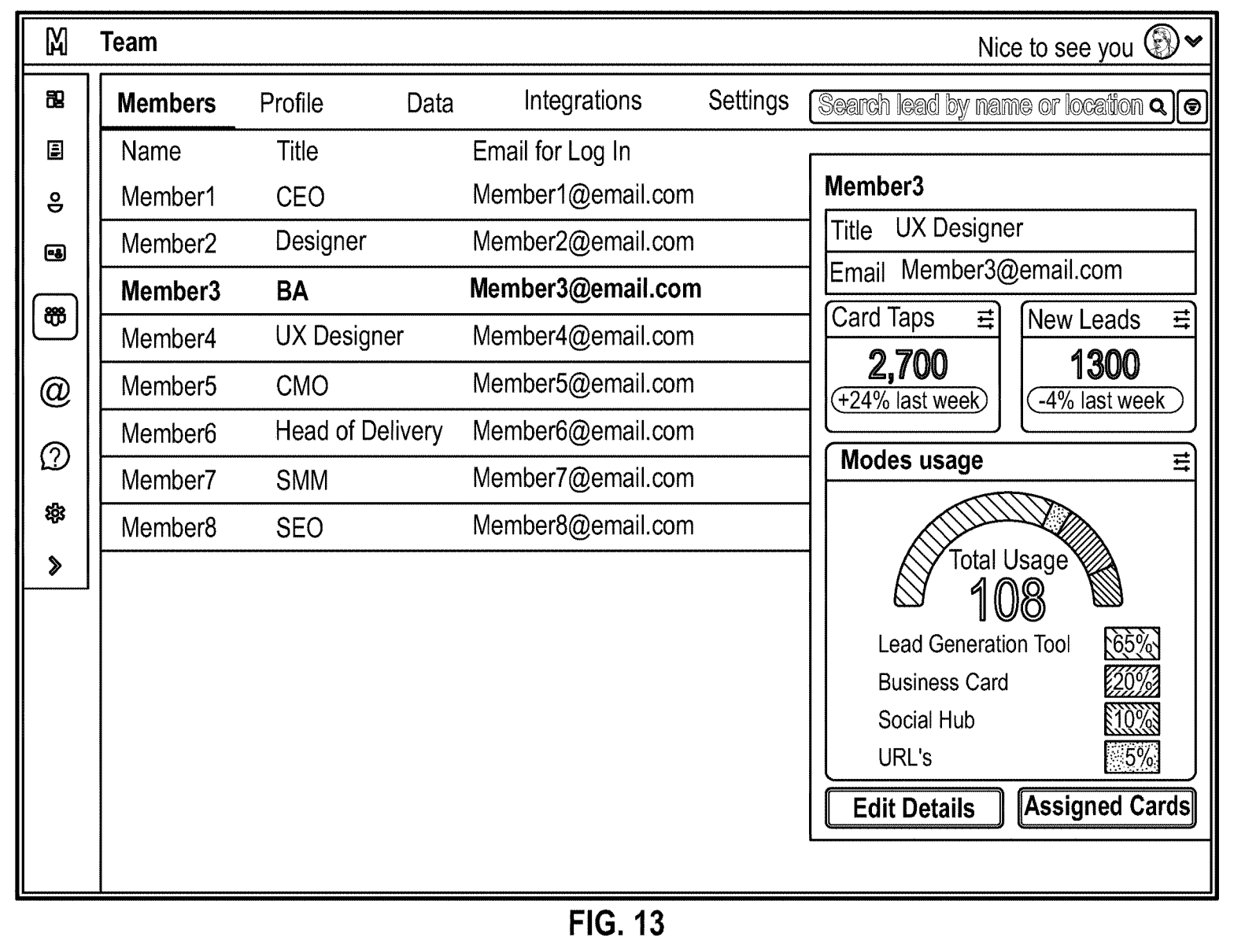

Referring to FIG. 13, the members interface may comprise a list of individuals sharing the same employer, division, or other relevant class. Accordingly, the administrator may add or remove the individuals to said employer, division, or class. The "team" may be comprised of the "members," such that the member's information and statistics may be aggregated into the team's information and statistics. Each of the individuals listed may be buttons selectable to present additional information. For example, upon selection of an individual, the member interface may render and display individual-specific data. Such data may include name, title, email, number of card taps, number of new leads, and/or modes usage. Further, the members interface may provide a button enabling the administrator to edit details of each individual and a button configured to view and/or edit the electronic business cards that have been assigned to said individual.

Figure 14:
FIG. 14 illustrates an embodiment of an integrations interface within a team module.

Referring to FIG. 14, the team module may include an integrations interface. The integrations interface may enable integration of users' records and information with one or more third-party programs. Accordingly, the integrations interface may allow communication, either directly or indirectly, between the third-party program and the network 130 and/or application system 300. For example, the integrations interface may include a sync option configured to synchronize users' information with onboarding utilities or other relevant tools and systems. Moreover, the integrations interface may include a third-party single sign-on (SSO) option restricting users to accessing the system via a third-party SSO. In such an embodiment, the integrations interface may provide a selectable list of individuals, wherein the administrator may choose which users will experience SSO integration. SSO permissibility and other related details may be stored in the user database 312. The SSO option may control access to the app, determine password criteria, determine if two-factor authentication is required, and/or provide insights into logic data and statistics.

Figure 15:
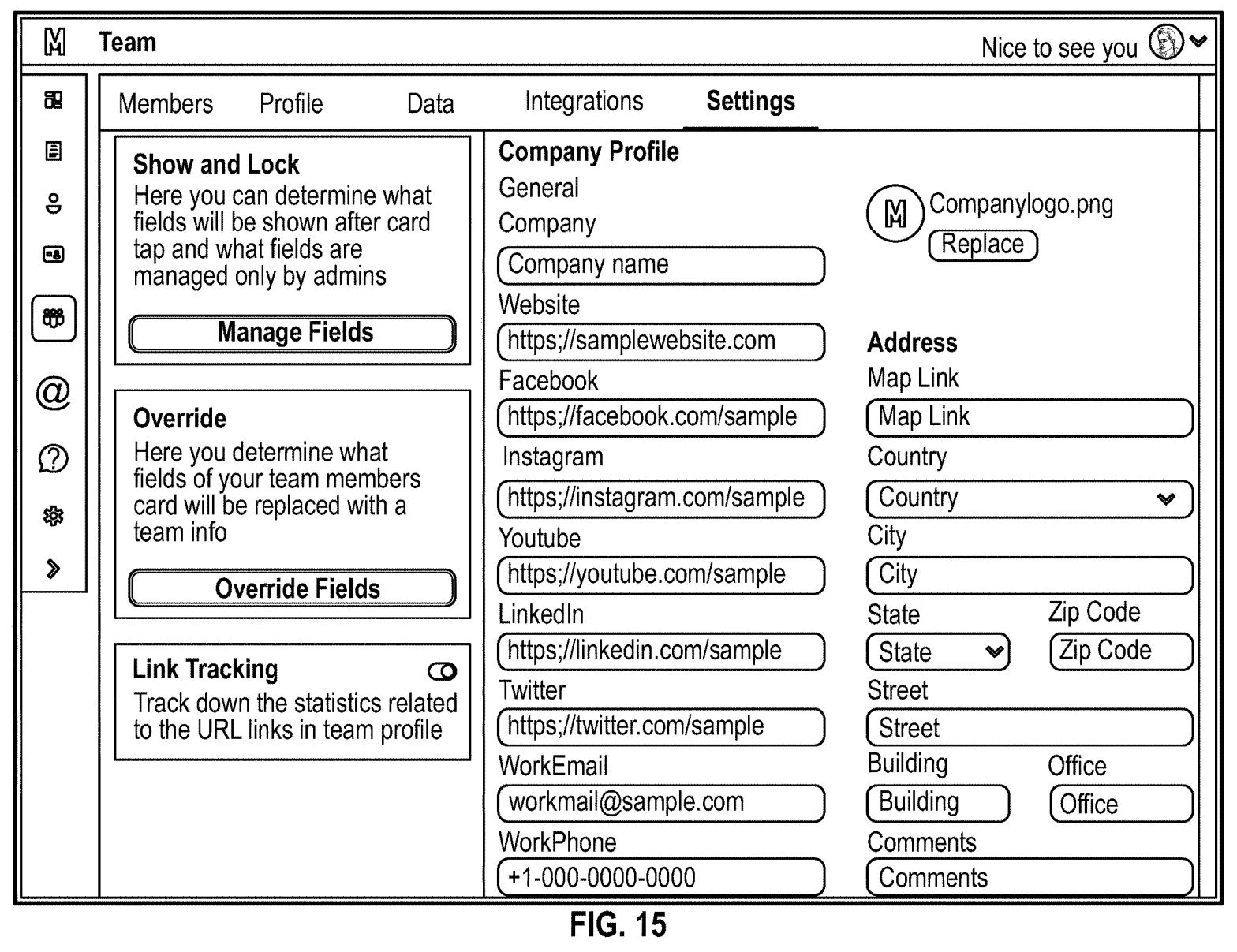

Referring to FIG. 15, the team module may include a settings interface. The settings interface may include a show and lock option, where the administrator can determine which fields will be shown after a card tap. The show and lock option may also allow alteration to which fields are managed solely by administrators. Further, the settings interface may include an override option, where the administrator may determine which fields of the users' electronic business card records may be replaced with team information. Moreover, the settings interface may include a link tracking option, where the system may track the statistics related to the URL links in the team profile. The settings interface may also include a company profile interface having a plurality of fields configured to aggregate to a company profile. As non-limiting examples, the company profile fields may include, but are not limited to: company name, website, various social media platform links, work email, work phone, address, interactive map link for said address, customizable additional comments, and/or a logo uploadable as any commonly accepted image file.

The link tracking feature, if enabled, may cause the system to track the links saved on the leads' device(s). Accordingly, the link tracking feature may cause the system to generate and display a notification in the user's portal and/or device. Such a feature may record the time when the link was accessed, the amount of time the lead spent interacting with the link, the number of visits to the link by a particular lead, and/or other relevant measured metrics.

Referring to FIG. 16, the show and lock option may direct to a show and lock interface, where the administrator may select which fields may be filled by their team members and which fields may be filled by a team administrator. In such an embodiment, the selections made on the show and lock interface may be communicated to the network 130 and/or application system 300, such that when administrators or users access their respective systems, the permissible fields are available. As a non-limiting example, the show and lock interface may include a team card fields interface and a locked fields interface. Each of the team card fields interface and the locked fields interface may include a list of the same fields, such that an administrator may select which fields are to be allocated for the team member and/or team administrator.

In an embodiment, to initiate an interaction between a user and a lead, the electronic business card is tapped on the lead's device (for example, a smartphone). The lead's device may recognize the NFC chip within the electronic business card and, consequently, may cause the lead's device to open a link. The link may be affiliated with the user's profile and, depending on the user's pre-determined settings, this triggers one or more options including, but not limited to: open the user's contact details (for example, in a vCard file format); open the user's personal landing page (also referred to as social profile hub); open the user's lead generation page; and open a URL as defined in the user's profile.

The embodiments disclosed herein may relate to a system for providing an electronic business card, including at least one computing device in operable communication with a network. An application system may be in operable communication with the user network to host an application system for transmitting information associated with an electronic business card to a database configured to store the information. A lead generation system may store a plurality of leads and generate an automated action to engage the lead. A method for generating a lead may be provided wherein information is captured via an electronic business card. A customizable form may be generated to collect information from the lead. A text message may then be transmitted to the lead containing contact details of the card owner and a text message may be transmitted to the card owner containing contact details of the lead. Further, an automated action may be initiated to engage the lead.

The electronic business card may be selectively integrated with marketing tools, provide control over the transmittal of information, and may include oversight tools which allow employers to oversee employee interactions and production therefrom.

In one aspect, a CRM system is in communication with the application. The CRM system may allow the user to monitor a sales funnel and lead status, define steps in the sales cycle, assign tasks, initiate text and email sequences, transmit advertisements to leads, and perform data enrichment.

In one aspect, the electronic business card is a virtual business card. For example, generated and displayed on the user's device and/or the recipient's device.

In one aspect, the application system permits data engagement and reporting, the sharing of QR codes from the application interface, card management, lead management, and automated actions.

In some aspects, the system also includes targeted marketing campaigns to particular contacts or groups of contacts. Such campaigns and groups may include the use of a wide variety of metrics and tools.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A contact management and communication system for communication of business card information, the system comprising:
    an electronic business card configured to cause a recipient device to initiate an action in the recipient device upon receiving or scanning electronic business card information from the electronic business card, wherein the electronic business card comprises at least one of a near-field communication chip and a QR code;

a network configured to enable indirect communication between the recipient device and an application system; and the application system in operable communication with the network, the application system configured to transmit a user information associated with a user of the electronic business card to a database configured to store the user information, and the application system being configured to permit the user to interact with the user information via a user interface, wherein the action is configured to automatically generate a customizable form to collect information from a lead;

wherein the network is configured to automatically transmit a first SMS message to the lead comprising contact details of the user upon submission of the form without an explicit request from the user or the lead to transmit the first SMS message; and wherein the network is further configured to automatically transmit a second SMS message to the user comprising contact details of the lead upon submission of the form without an explicit request from the user or the lead to transmit the second SMS message.

2. The contact management and communication system of claim 1, wherein the action is configured to present, via the recipient device, a lead collection interface configured to receive a first lead contact detail of a lead, the lead collection interface in electronic communication with the network.

3. The contact management and communication system of claim 2, wherein the action is further configured to present, via the recipient device, an enriched lead collection interface configured to receive at least a second lead contact detail of the lead, the enriched lead collection interface in electronic communication with the network.

4. The contact management and communication system of claim 2, further comprising an administrative panel to permit an administrator to interact with the user information associated with the electronic business card.

5. The contact management and communication system of claim 4, wherein the administrative panel is configured to assign a company profile to the user such that the company profile is appended to the user information.

6. The contact management and communication system of claim 4, the administrative panel comprising a link tracking option, wherein actuation of the link tracking option enables recordation, via the application system, of recipient interactions with the user information, and wherein the recipient interactions comprise at least a recipient's submission of the first lead contact detail.

7. The contact management and communication system of claim 6, wherein the user interface further comprises a lead interface, wherein the lead interface is configured to display the recipient interactions with the user information.

8. The contact management and communication system of claim 4, wherein the user interface is configured to present a plurality of fields and a plurality of inputs to the user, wherein each of the plurality of fields corresponds to one of the plurality of inputs, wherein the plurality of inputs is configured to receive a plurality of values, and wherein the user information is comprised of the plurality of values.

9. The contact management and communication system of claim 8, the administrative panel further comprising a show and lock feature configured to set permissions in the plurality of inputs, wherein a first portion of the plurality of inputs is configured to receive a first portion of the plurality of values, via the user, and a second portion of the plurality of inputs is configured to receive a second portion of the plurality of values, via the administrator.

10. The contact management and communication system of claim 1, further comprising a QR code disposed on the electronic business card, the QR code encoded with the electronic business card information and configured to instigate the action on the recipient device.

11. The contact management and communication system of claim 1, wherein the user information comprises a custom code snippet configured to run on the recipient device, extract recipient information, via the recipient device, and transmit the recipient information to the network.

12. The contact management and communication system of claim 11, wherein the custom code snippet is appended to the user information by an administrator, via an administrative panel in communication with the application system.

13. The contact management and communication system of claim 11, wherein the extraction of the recipient information comprises placing a cookie on the recipient device.

14. The contact management and communication system of claim 11, further comprising a machine learning algorithm on the application system, the machine learning algorithm configured to extrapolate a marketing plan from the recipient information.

15. The contact management and communication system of claim 1, wherein:

the electronic business card comprises a near-field communication chip, the near-field communication chip comprising a memory and an antenna, the electronic business card information being stored within the memory, the electronic business card information is encoded within an instructive radio frequency, the antenna is configured to capture a radio frequency field from the recipient device, the radio frequency field being configured to induce a current in the near-field communication chip, the recipient device is near-field communication enabled, and the electronic business card information is configured to initiate the action in the recipient device via the instructive radio frequency when the near-field communication chip and the recipient device are within an operating distance.

16. A method for generating a lead using an electronic business card, the method comprising:

capturing information associated with a lead via the electronic business card, wherein the electronic business card comprises at least one of a near-field communication chip and a QR code;

automatically generating a customizable form to collect information from the lead upon capturing the information associated with the lead via the electronic business card;

automatically transmitting a first SMS message to the lead comprising contact details of a card owner upon submission of the form without an explicit request from the card owner or the lead to transmit the first SMS message; and automatically transmitting a second SMS message to the card owner comprising contact details of the lead upon submission of the form without an explicit request from the card owner or the lead to transmit the second SMS message.

17. The method of claim 16, further comprising:

receiving, a first lead contact detail, via the customizable form; and receiving, a second lead contact detail, via the customizable form, wherein the first lead contact detail and the second lead contact detail are received in different instances.

18. The method of claim 16, further comprising:
presenting, via a user interface, a plurality of fields and a plurality of inputs to the card owner,
   wherein each of the plurality of fields corresponds to one of the plurality of inputs; and
receiving, via the plurality of inputs, a plurality of values,
   wherein the contact details of the card owner are comprised of the plurality of values.

* * * * *